Patented May 4, 1937

2,079,127

UNITED STATES PATENT OFFICE 2,079,127

PROCESS FOR REMOVAL OF SULPHUR FROM ACETIC ANHYDRIDE

Herbert E. Martin, Cumberland, Md., assignor to Celanese Corporation of America, a corporation of Delaware No Drawing. Application December 22, 1933, Serial No. 703,558

2 Claims. (Cl. 260—123)

This invention relates to the removal of sulphur from acetic anhydride for use in the production of organic esters of cellulose of improved quality for spinning into filaments or forming into sheets and foils, of improved clarity and stability and of improved quality generally. This invention more specifically relates to the treatment of the organic acid anhydride used in forming the ester, part of which is continually recirculated through the process.

An object of the invention is the production of a non-corrosive organic ester of cellulose that formed into filaments or sheets does not discolor upon contact with metals and exposure to light. Another object of the invention is the production of an organic ester of cellulose that is stable in the presence of light and metals when in solution such as those solutions used for forming filaments and foils. Other objects of the invention will appear from the following detailed description.

In the manufacture of organic esters of cellulose, the esterification of the cellulose is usually conducted by treating a batch of cellulose with an excess of organic acid anhydride in the presence of a substantial amount of a diluent or solvent for the ester of cellulose being formed. The diluent or solvent may be the concentrated acid corresponding to the acid forming the anhydride. After the cellulose ester has been formed there may be added to the solution sufficient water to convert the remaining anhydride to acid and the batch is permitted to ripen or hydrolize to the desired solubility. Upon attaining the desired solubility characteristics, the cellulose ester may be precipitated by the addition of water, separated from the solution and then washed. In certain processes the acid and the acid anhydride are separated from the formed cellulose esters before ripening the cellulose esters or converting the anhydride to the acid. The separated dilute acid, drainings and washings are distilled or otherwise treated, such as by extraction with solvents, or by neutralizing to form salts, for the recovery of the acid which is used at least in part to form the anhydride for a succeeding bath of cellulose.

Thus in preparing cellulose acetate, cellulose is acetylated by treatment with acetic anhydride and a catalyst, in the presence of glacial acetic acid as a solvent for the cellulose acetate that is formed. After completion of the acetylation, the resulting solution of cellulose acetate in glacial acetic acid is separated by precipitation of the cellulose acetate upon addition of water and the acid drained from the precipitate. The precipitation of the cellulose acetate may be performed before or after the cellulose acetate has ripened. The drainings or washings which are in the form of aqueous acetic acid are then treated by distillation, which may be in the presence of an entraining liquid, or by other suitable concentrating processes for the recovery of the acid some of which is further processed to the anhydride. A method of forming the anhydride is to neutralize the aqueous acetic acid liquor to form sodium or other metallic acetate, and treating the dry acetate with sulphur dichloride or a mixture of sulphur and chlorine to form the anhydride. Both the acid and the anhydride are raised to the desired quantity by addition of fresh acid and anhydride and returned to another acetylation batch.

In each cycle of this process, the anhydride becomes contaminated with sulphur and labile organo-sulphur compounds that are not completely removed in the ordinary rectifying processes. These compounds become attached to the cellulose ester and cannot be removed therefrom by washing, filtering or other like commercial expedients. It is these compounds that cause corrosion of tanks, pipelines, spinnerets, rolls or other metallic elements or machine parts that are contacted by the cellulose ester or solutions thereof. This corrosion not only destroys the equipment but the metallic salts or oxides that are formed are dissolved or absorbed by the cellulose ester or react with the cellulose ester and throw same off color and destroy certain of its spinning properties. These sulphur and labile organo-sulphur compounds also cause a charring or browning of a solution of cellulose ester upon standing even when not in contact with metals or materials affected by the solution.

According to my invention then I treat the anhydride by a redistillation or intimate mixing in the presence of elements or compounds that absorb and/or react with the sulphur and labile organo-sulphur compounds such that the anhydride returned to the esterifying process is free of such injurious compounds. This purifying distillation or mixing in the presence of an absorbent may be concurrent with the fractional distillation employed to concentrate or purify the anhydride or it may be a separate distillation. The distillation may be in the nature of reflux distillation, while the mixing is preferably in the form of vigorous agitation.

Many elements and compounds may be used as the absorbing or reacting agent examples of which are copper nitrate, $Cu(NO_3)_2.3H_2O$, fuming nitric acid, manganese acetate, $Mn(OOC.CH_3)_2.4H_2O$, potassium permanganate, $KMnO_4$, brass bronzing powder, copper powder, sodium acetate, bone char, cocoanut shell char, mercury, copper acetate, copper sulphate, copper chloride, zinc dust, copper carbonate, barium acetate, silver nitrate, aluminum powder, magnesium turnings, sodium nitrate, silver nitrate, sodium or potassium chlorate, copper acetate, manganese sulphate, cerium hydroxide, cobalt hydroxide, sodium or potassium dichromate, sodium or potassium permanganate and manganese sulphate. These absorbing or reacting agents may be used alone or two or more may be mixed together as the absorbing or reacting agent. With any of the absorbing or reacting agents there may be used gels and similar compounds as aids in filtering the absorbent material when the purification process is one of intimately mixing the absorbent material with the anhydride and then filtering the mixture to separate the solid material from the purified anhydride.

The acid from the esterification solution may be reconverted into the acid anhydride in any suitable manner. Thus the drainings, washings or distillates from the solution may be treated with soda ash to form the sodium salt of the acid which is dried and treated with sulphur dichloride, a mixture of sulphur and chlorine, sulphuric anhydride alone or mixed with sulphuric acid or chlorsulphonic acid. The concentrated acid obtained by distillation of the esterification solution may be converted to the anhydride by passing the hot vapors of same over a water binding agent such as zinc chloride, calcium chloride, etc., or the anhydride may be formed by passing the solution of acid at elevated temperatures over suitable catalysts.

The acid anhydride formed according to any suitable method from the esterification solution is treated according to this invention with an absorbent agent which term is meant to include those elements or compounds that also react chemically with the sulphur impurities either organic or inorganic to form compounds that are easily separatable from the resulting purified acid or anhydride. Thus the anhydride may be placed in a reflux still having therein the absorbent agent or the anhydride may be mixed while hot or cold with the absorbent agent by agitating the two together by stirring a mixture of the two or by any suitable method of bringing the liquid in intimate contact with the absorbent agent.

This invention is applicable to the preparation of any organic ester of cellulose that is formed by esterifying cellulose in any suitable form by means of any esterifying agent as an organic acid anhydride in the presence of a suitable catalyst and an organic acid as solvent or diluent in any suitable manner. The invention may be employed in the making of any suitable organic ester of cellulose such as cellulose acetate, cellulose formate, cellulose propionate and cellulose butyrate. Cellulose in any suitable form such as cotton, cotton linters, wood pulp either sulphite or soda pulp, reconstituted cellulose etc., may be employed in making the cellulose esters. This cellulose may be activated by pretreatment with lower aliphatic acids or by treatment with alkali, etc. The esterifying agent may be acetic anhydride, propionic anhydride, or butyric anhydride, depending upon the ester of cellulose to be formed. The esterification may be carried out in the presence of a suitable catalyst such as sulphuric acid, zinc chloride, sodium bisulphate and methyl sulphate. While it is preferred to employ acetic acid as the diluent or solvent for the cellulose esters to be formed, any other suitable organic acid such as propionic acid or butyric acid may be employed.

While it is preferable first to hydrolize or ripen the cellulose ester by adding water and allowing the resulting solution to stand at suitable temperatures for such a time until the cellulose ester develops the desired solubility characteristics, prior to separating the cellulose ester from the liquid of the solution, the invention is not limited thereto. The separation of the cellulose ester and solvent may be carried out immediately after the completion of the esterification process, or at any time subsequent thereto.

The acid recovered from the esterification process is concentrated and converted into the anhydride. This anhydride may contain as much as 400 parts per million of sulphur and labile organo-sulphur compounds. By treating this anhydride with an absorbent agent, this contamination may be reduced to from 20 to 1 part per million, depending upon the agent used and the length of treatment. In using as absorbent agents compounds containing either copper or sodium, free or in combination as bases or salts, the time of treatment required is from 1 to 20 hours and at a temperature of from room temperature to 90° C. The amount of absorbent agent used will depend upon the nature of the same and will vary from 1 to 10 grams for every 2 liters of anhydride treated. The absorbent agent is used in a large excess of the calculated amount needed and may be carried over from one batch to the next without injurious results.

The organic esters of cellulose formed by this invention may be employed for the making of filaments, yarns, bristles, straws, foils, films, sheets, plastic masses, molding powders, lacquers coating compositions and for all other purposes to which cellulose derivatives are put.

In order further to illustrate the invention but without being limited thereto, the following specific examples are given.

*Example I*

2,000 parts by weight of acetic anhydride formed from acetic acid recovered from a cellulose acetate acetylation solution is mixed with 2 parts by weight of brass bronzing powder. The resulting mixture is heated to 90° C. and held at that temperature for 1½ hours while being agitated. The acetic anhydride is distilled off till the bronze powder and absorbent material is dried to a paste. The sulphur and labile organo-sulphur compounds of the anhydride is reduced from 155 parts per million to 6 parts per million.

*Example II*

2,000 parts by weight of acetic anhydride formed from acetic acid recovered from a cellulose acetate acetylation solution and which contains over 155 parts per million of sulphur and organo-sulphur compounds is agitated at room temperature with 10 parts by weight of copper nitrate, $Cu(NO_3)_2.3H_2O$, for 18 hours. The mixture is then filtered. The sulphur and organo-sulphur compounds are reduced to less than 3 parts per million in the filtrate. This filtrate is then employed in an acetylation mixture for acetylating cotton linters to form cellulose acetate.

*Example III*

Example II is repeated except that the temperature is raised to 80° C. and the time of treatment reduced to 20 minutes. The same results are obtained.

*Example IV*

200 parts by weight of acetic anhydride containing 109 parts per million of sulphur compounds is treated with 1 part by weight of sodium dichromate $Na_2Cr_2O_7.2H_2O$, for 15 minutes at 85° C. and distilled off. The resulting acetic anhydride contains less than 5 parts per million of sulphur compounds.

*Example V*

2,000 parts by weight of acetic anhydride containing 109 parts per million of sulphur compounds is treated with 5 parts by weight of either sodium or copper acetate for 1 hour at 85° C. and distilled off. The resulting acetic anhydride contains less than 5 parts per million of sulphur compounds and when used as the acetylating agent for cellulose acetate it produces one that is free from corrosive properties and that is stable to light.

Having described my invention what I desire to secure by Letters Patent is:

1. Process for the removal of sulphur and labile organo-sulphur compounds from acetic anhydride, which comprises agitating the anhydride with brass bronzing powder and then distilling off the anhydride.

2. Process for the removal of sulphur and labile organo-sulphur compounds from acetic anhydride, which comprises mixing the anhydride with brass bronzing powder, agitating the mixture at 90° C. and then distilling off the anhydride.

H. E. MARTIN.